United States Patent [19]

Dawson

[11] Patent Number: 4,989,340
[45] Date of Patent: Feb. 5, 1991

[54] ALIGNMENT ADJUSTING MECHANISM

[75] Inventor: Christopher M. Dawson, Thornbury, United Kingdom

[73] Assignee: Renishaw plc, England

[21] Appl. No.: 510,828

[22] Filed: Apr. 18, 1990

[30] Foreign Application Priority Data

Apr. 22, 1989 [GB] United Kingdom ............... 8909216

[51] Int. Cl.⁵ .............................................. G01B 7/28
[52] U.S. Cl. ...................................... 33/645; 33/502; 33/503
[58] Field of Search ................ 33/502, 503, 504, 505, 33/645, 533

[56] References Cited

U.S. PATENT DOCUMENTS 4,805,314 2/1989 Hayashi et al. ....................... 33/503

Primary Examiner—Harry N. Haroian
Attorney, Agent, or Firm—Oliff & Berridge

[57] ABSTRACT

An alingment adjusting mechanism secures and adjusts the alignment of a magazine (10) which retains a plurality of sensing elements (12) within the working area of a coordinate measuring machine) relative to the bed of a machine on which the magazine is mounted. The mechanism comprises a plate (20), rigidly connected to the bed, and a base (18), which supports the magazine (10) secured to the bed of the machine via the plate (20); the base (18) is resiliently secured to the plate (20) by bolts (26), washers (27) and disc springs (30). The bearing end of a grub screw (40) engages a conical recess (46), thus providing a pivot point for pivoting of the base (18) relative to the plate (20). Two further pairs of grub screws (34) and (48) bear against the plate (20). Adjustment of the attitude of the base (18) about the axes (56) (the roll), (54) (the pitch), and (58) (the yaw) is achieved using the grub screws (34, 40, 48).

8 Claims, 2 Drawing Sheets

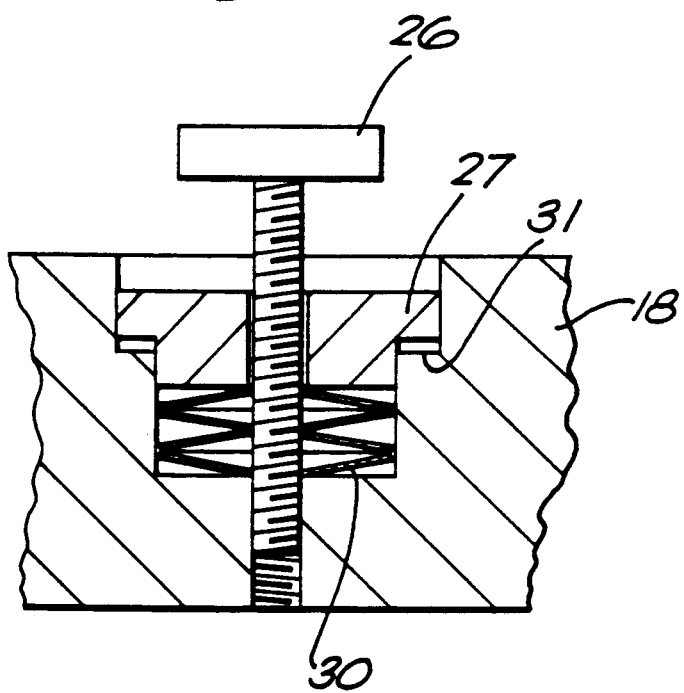

ALIGNMENT ADJUSTING MECHANISM

BACKGROUND OF THE INVENTION

The invention relates to an alignment adjusting mechanism, which may be used for example to adjust the alignment of a magazine which retains a plurality of sensing elements ready for use, within the working area of a coordinate positioning machine (e.g. a coordinate measuring machine or machine tool).

DESCRIPTION OF PRIOR ART

It is known to provide a magazine in the form of a rack which retains, for example, a plurality of workpiece-sensing probes such as touch probes, or a plurality of styli for such probes. Such a rack is described in WO85/02138. The rack is usually bolted to the table of a coordinate measuring machine, having an arm or quill which is movable in the directions of three orthogonal axes X,Y and Z, It is desirable that the rack has an alignment which corresponds closely to the machine axes X,Y and Z, since this facilitates correct exhange of probes or styli, minimising any risk of collision between the rack and the movable parts of the machine. Adjustment of the alignment of existing racks is made by four adjusting screws mounted in the base of the rack, which bear against the table of the coordinate measuring machine. Because of the high accuracy required of measurements made with a coordinate measuring machine, the table of the machine is usually made of granite or steel. The action of the adjusting screws mounted in the base of the rack inevitably causes pitting in the table or bed of the machine.

SUMMARY OF THE INVENTION

The present invention provides an alignment adjusting mechanism for adjusting the alignment of a magazine which retains a plurality of sensing elements within the working area of a coordinate positioning machine, the mechanism comprising a plate mountable rigidly to the bed of the machine; a base for supporting the magazine; securing means for securing the base to the bed of the machine; and adjusting means provided on one of plate and the base for applying an adjusting force to the other of the plate and the base, thereby to adjust the relative position of the base and the plate.

This enables any force which is used to adjust the position of the base relative to the plate to be applied to either the plate or the base, thereby avoiding pitting of the machine bed.

BRIEF DESCRIPTION OF DRAWINGS

An embodiment of the invention will now be described, by way of example, and with reference to the accompanying drawings in which:

FIG. 3 shows a detail of FIG. 2.

DESCRIPTION OF PREFERRED EMBODIMENTS

Figure 1:
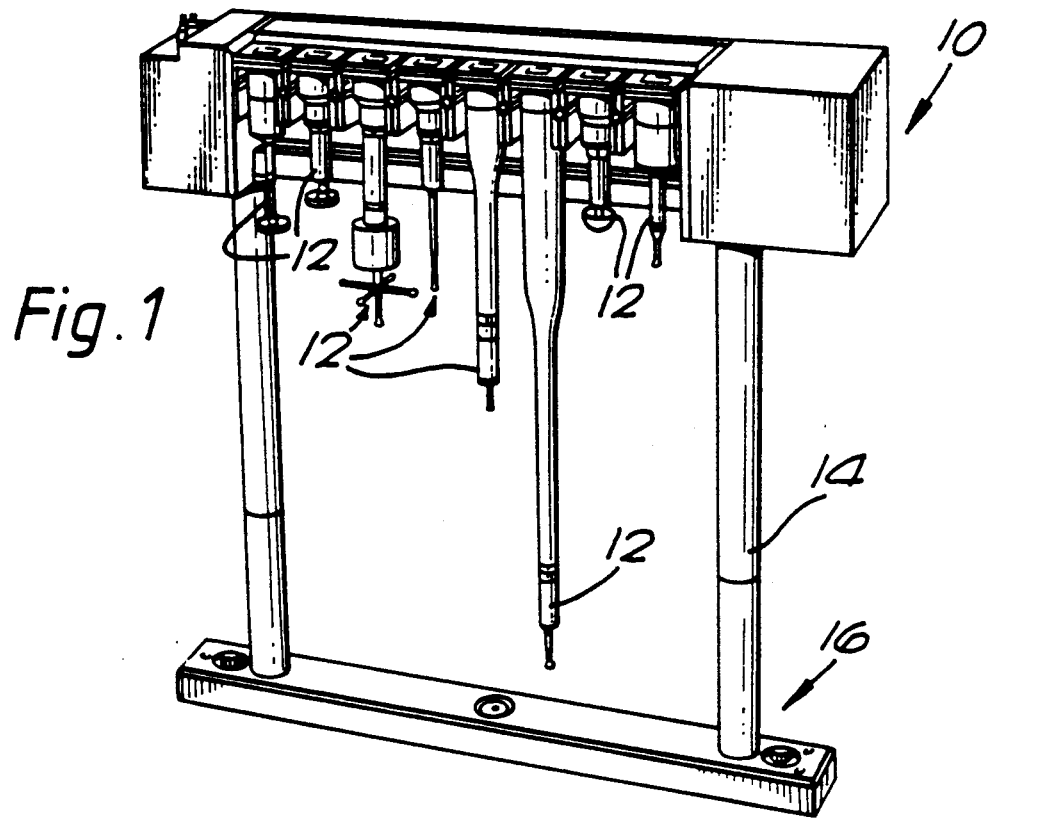
FIG. 1 shows a perspective view of a magazine retaining sensing elements.

Referring now to FIG. 1, a magazine containing a plurality of touch probes has the form of a rack 10. The various probes 12, each of which is suitable for performing a particular function are retained in the rack 10. The rack 10 is supported by a pair of legs 14, and is mounted to the bed of a coordinate measuring machine (not shown) by an adjusting mechanism generally indicated by reference numeral 16.

Figure 2:
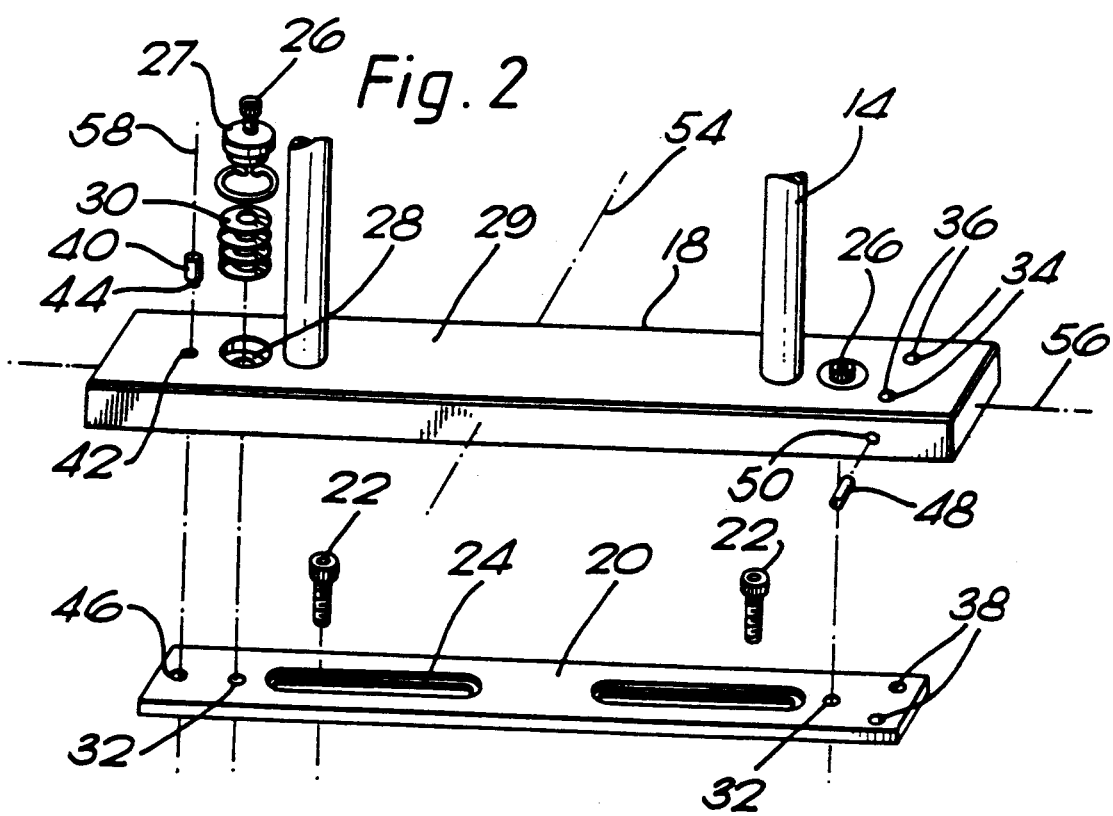
FIG. 2 shows an exploded perspective view of the adjusting mechanism used to mount the magazine shown in FIG. 1.

Referring now to FIGS. 2 and 3, the legs 14 are mounted to a hollow rectangular base 18, by a pair of bolts (not shown). The base 18 is secured to the bed of the machine by mounting the base 18 to a rectangular plate 20 by a pair of bolts 26 (the base may be secured directly to the bed if desired); the plate 20 lies inside the hollow body of the base 18. The plate 20 is mounted to the table of a coordinate measuring machine by a pair of bolts 22 which seat in a pair of longitudinally extending slots 24.

The heads of the bolts 26 bear via a washer 27 and a stack of disc springs 30 (which provide resilient engagement of base 18 and plate 20) against seats 28 provided in the upper surface 29 of the base, and the shanks of the bolts 26 engage screw-threaded bores 32 in the body of the plate 20. The washer 27 engages a counterseat 31 (shown in detail in FIG. 3) when the bolt 26 is fully tightened against the stack of disc springs 30. The counterseat 31 thus limits the maximum compression of the springs 30 to a predetermined level which provides sufficient force to enable secure engagement of the base 18 and plate 20. Disc springs are not essential; any spring mechanism which provides resilient engagement of the base 18 and plate 20, and as a result a small range of compliance in the engagement of base 18 and plate 20 will suffice to provide easy adjustment.

A pair of grub screws 34 lie in respective screw threaded bores 36 in one end of the upper surface 29 of the base 18, and bear against a pair of steel pads 38 provided on the upper surface of the plate 20. A further grub screw 40 lies in screw threaded bore 42 provided in the upper surface 29 of the base 18 at the end distal to the pair of grub screws 34. The grub screws 34 and 40 are ball ended thrust screws, which have at their bearing ends, a ball bearing seated within the body of the screw, but projecting out of the body for contact with the pads 38 on plate 20. The ball at the bearing end 44 of grub screw 40 seats in a conical recess 46 in the upper surface of the plate 20. Two grub screws 48 lie in screw threaded bores 50 which extend at right angles to the bores 36 and 42 and which lie in opposite sides of the plate 18, at the same end as the bores 36. The bearing ends of grub screws 48 bear against opposite sides of the base 20. (In FIG. 2, only one of the two sets of screws 48, and bores 50 can be seen). The screws 34,40, and 48 act as bearing members for applying an adjusting force to the plate 20.

The magazine is mounted on the bed of a coordinate measuring machine as follows. The plate 20 is mounted to the bed of the machine with bolts 22. The base 18 is then mounted to the plate 20 by bolts 26, which are adjusted so as to compress the stacks of disc springs 30 to approximately half way between total compression and complete expansion of the springs 30. This enables adjustment of the base 18 to be made by both the screwing in, and retraction of the grub screws 34 40 and 48. The base 18 may then be adjusted relative to the plate 20 by relatively adjusting grub screws 34 and 40 to adjust rotation of the base 18 about axis 54 (the 'pitch'); by adjusting grub screws 34 relative to each other to adjust rotation of base 18 about the axis 56 (the 'roll'); and adjusting grub screws 48 to adjust rotation of the base 18 about axis 58 (the 'yaw'). The screws 40 and recess 46 provide a pivot point for adjustment of the base 18, and simultaneously prevent translation of the base 18 relative to the plate 20. The preferred order of adjustment is to adjust the roll first using one of screws 34, then to adjust the pitch using the screw 40, and finally the yaw. When the desired alignment of the rack is acheived the bolts 26 are then fully tightened.

I claim:

1. An alignment adjusting mechanism for adjusting the alignment of a magazine which retains a plurality of sensing elements within the working area of a coordinate positioning machine, the mechanism comprising a plate mountable rigidly to the bed of the machine; a base for supporting the magazine; securing means for securing the base to the bed of the machine; and adjusting means provided on one of plate and the base for applying an adjusting force to the other of the plate and the base, thereby to adjust the relative position of the base and the plate.

2. A mechanism according to claim 1, wherein the adjusting means comprises means preventing translation of the base relative to the plate, and means for independently adjusting the rotational displacement of the base relative to the plate about each of three perpendicular axes.

3. A mechanism according to claim 1 wherein the securing means comprises means for resiliently securing the base to the bed of the machine, to provide a range of compliant movement of the base relative to the plate.

4. A mechanism according to claim 2 wherein the securing means comprises means for resiliently securing the base to the bed of the machine, to provide a range of compliant movement of the base relative to the plate.

5. A mechanism according to claim 3 wherein the adjusting means comprises a plurality of bearing members provided on one of the base and the plate and bearing against the other of the base and the plate, for adjusting the position of the base relative to the plate within the range of compliant movment.

6. A mechanism according to claim 5 having a single bearing member provided at one end of the base, and engaging a detent in the plate thereby providing a pivot point for pivoting of the base relative to the plate, and means provided at another end for independently adjusting the attitude of the base relative to the plate about each of two perpendicular axes which intersect at the pivot point.

7. A mechanism according to claim 6 wherein the single bearing member is adjustable relative to the base thereby enabling adjustment of the attitude of the base relative to the plate about a third axis perpendicular to each of said two perpendicular axes.

8. A mechanism according to claim 7 wherein the securing means secures the base to the bed of the machine via the plate.

* * * * *